(12) United States Patent
Wang et al.

(10) Patent No.: US 11,870,594 B2
(45) Date of Patent: Jan. 9, 2024

(54) FACILITATING A GROUP HYBRID AUTOMATIC REPEAT REQUEST PROCEDURE FOR SIDELINK GROUP CASE IN ADVANCED NETWORKS

(71) Applicant: AT&T Intellectual Property I, L.P., Atlanta, MA (US)

(72) Inventors: Xiaoyi Wang, Austin, TX (US); Milap Majmundar, Austin, TX (US); Salam Akoum, Austin, TX (US); Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 341 days.

(21) Appl. No.: 16/411,017

(22) Filed: May 13, 2019

(65) Prior Publication Data

US 2020/0366427 A1    Nov. 19, 2020

(51) Int. Cl.
*H04L 1/1867* (2023.01)
*H04W 8/30* (2009.01)
(Continued)

(52) U.S. Cl.
CPC .......... *H04L 1/1896* (2013.01); *H04L 1/1816* (2013.01); *H04W 8/30* (2013.01); *H04W 84/18* (2013.01)

(58) Field of Classification Search
CPC ... H04L 1/1896; H04L 1/1816; H04L 1/1893; H04L 1/1861; H04L 1/1864; H04W 8/30; H04W 84/12; H04W 84/18
See application file for complete search history.

(56) References Cited

U.S. PATENT DOCUMENTS

2019/0020381 A1*   1/2019   Tooher .................. H04W 72/14
2019/0053267 A1*   2/2019   Kim ...................... H04W 76/14
(Continued)

FOREIGN PATENT DOCUMENTS

WO    WO-2018137129 A1 *   8/2018
WO    WO-2020172576 A1 *   8/2020    ............ H04W 72/02

OTHER PUBLICATIONS

ETRI, R1-1904666, Discussion on NR V2X Sidelink Retransmission, Apr. 8-12, 2019, 3GPP TSG RAN WG1 Meeting #96bis, whole document (Year: 2019).*

(Continued)

*Primary Examiner* — Michael Thier
*Assistant Examiner* — Jose L Perez
(74) *Attorney, Agent, or Firm* — Guntin & Gust, PLC; Robert Gingher

(57) ABSTRACT

Facilitating a group hybrid automatic repeat request procedure for sidelink group-case in advanced networks (e.g., 4G, 5G, 6G, and beyond) is provided herein. Operations of a method can comprise determining, by a first device comprising a processor, that first information received via a sidelink control channel is successfully decoded and that second information received via a sidelink shared channel is not successfully decoded. The first information and the second information can be received from a second device. Further, the method can comprise transmitting, by the first device, negative acknowledgement data based on a group hybrid automatic repeat request feedback procedure. The method also can comprise receiving, by the first device, retransmission of the second information via the sidelink shared channel from a group of devices in response to the negative acknowledgement data.

20 Claims, 11 Drawing Sheets

(51) Int. Cl.
*H04L 1/1812* (2023.01)
*H04W 84/18* (2009.01)

(56) References Cited

U.S. PATENT DOCUMENTS

| | | | |
|---|---|---|---|
| 2020/0053835 A1* | 2/2020 | Ye | H04W 88/06 |
| 2020/0067650 A1* | 2/2020 | Kim | H04W 4/40 |
| 2020/0106559 A1* | 4/2020 | Vilaipornsawai | H04B 7/0408 |
| 2020/0106566 A1* | 4/2020 | Yeo | H04W 28/04 |
| 2020/0127775 A1* | 4/2020 | Su | H04L 1/1854 |
| 2020/0136760 A1* | 4/2020 | Hahn | H04W 72/04 |
| 2020/0220694 A1* | 7/2020 | Khoryaev | H04W 28/04 |
| 2020/0259600 A1* | 8/2020 | Cao | H04L 1/0065 |
| 2020/0288286 A1* | 9/2020 | Hwang | H04L 1/1861 |
| 2020/0305127 A1* | 9/2020 | Huang | H04W 72/0453 |
| 2020/0344722 A1* | 10/2020 | He | H04W 72/0446 |
| 2020/0351032 A1* | 11/2020 | Wu | H04L 1/1861 |
| 2020/0351033 A1* | 11/2020 | Ryu | H04W 72/0453 |
| 2021/0160014 A1* | 5/2021 | Selvanesan | H04W 76/27 |
| 2021/0167897 A1* | 6/2021 | Seidel | H04L 1/1864 |
| 2021/0219268 A1* | 7/2021 | Li | H04W 72/20 |
| 2021/0297199 A1* | 9/2021 | Miao | H04L 1/1896 |
| 2021/0306824 A1* | 9/2021 | Li | H04L 1/1887 |
| 2021/0320755 A1* | 10/2021 | Faxer | H04L 1/1896 |
| 2022/0052800 A1* | 2/2022 | Sun | H04L 1/1867 |
| 2022/0070972 A1* | 3/2022 | Belleschi | H04W 4/08 |
| 2022/0109527 A1* | 4/2022 | Hwang | H04W 72/23 |
| 2022/0191725 A1* | 6/2022 | Ashraf | H04L 5/0053 |
| 2022/0217760 A1* | 7/2022 | Iyer | H04L 5/0053 |

OTHER PUBLICATIONS

Nokia, R1-1905340, Discussion on Sidelink groupcast HARQ, Apr. 8-12, 2019, 3GPP TSG RAN WG1 Meeting #96bis, whole document (Year: 2019).*

Ericsson, R1-1905477, Resource allocation for Mode-2 transmissions, Apr. 8-12, 2019, 3GPP TSG RAN WG1 Meeting #96bis, whole document (Year: 2019).*

Kim et al., (U.S. Appl. No. 62/545,423 [provisional of US 2019/0053267 A1]), Aug. 14, 2017, USPTO, whole document (Year: 2017).*

Ye et al. (U.S. Appl. No. 62/736,811 [provisional of US 2020/0053835 A1]), Sep. 26, 2018, USPTO, whole document (Year: 2018).*

Sequans Communications, R1-1905388, On HARQ procedure for NR sidelink, Apr. 8-12, 2019, 3GPP TSG RAN WG1 Meeting #96bis, whole document (Year: 2019).*

Samsung, R1-1902278, Considerations on Sidelink HARQ Procedure, Feb. 25-Mar. 1, 2019, 3GPP TSG RAN WG1 #96, whole document (Year: 2019).*

RAN1, R1-1905906, LS on sidelink HARQ feedback for groupcast, Apr. 8-12, 2019, 3GPP TSG RAN WG1 Meeting #96bis, whole document (Year: 2019).*

Fujitsu, R1-1901944, Discussion on HARQ-ACK feedback for NR-V2X, Feb. 25-Mar. 1, 2019, 3GPP TSG RAN WG1 #96, whole document (Year: 2019).*

Khoryaev et al., U.S. Appl. No. 62/842,436—System and method of resources selection for feedback based NR-V2X communication (provisional application of US 2020/0220694 A1), May 2, 2018, USPTO, whole document (Year: 2019).*

* cited by examiner

FACILITATING A GROUP HYBRID AUTOMATIC REPEAT REQUEST PROCEDURE FOR SIDELINK GROUP CASE IN ADVANCED NETWORKS

TECHNICAL FIELD

This disclosure relates generally to the field of mobile communications and, more specifically, to facilitating a hybrid automatic repeat request procedure to support highly reliable communications.

BACKGROUND

The 5th generation (5G) wireless systems represent a next major phase of mobile telecommunications standards beyond the current telecommunications standards of 4th generation (4G). Rather than faster peak Internet connection speeds, 5G planning aims at higher capacity than 4G, allowing a higher number of mobile broadband users per area unit, and allowing consumption of higher or unlimited data quantities. This can enable a large portion of the population to stream high-definition media many hours per day with their mobile devices, when out of reach of wireless fidelity hotspots. The 5G research and development also aims at improved support of machine-to-machine communication, also referred to as the Internet of Things (IoT), aiming at lower cost, lower battery consumption, and lower latency than 4G equipment.

The above-described background relating to facilitating Hybrid Automatic Repeat Request Procedure (HARQ) feedback types for new radio sidelink communication is merely intended to provide a contextual overview of some current issues, and is not intended to be exhaustive. Other contextual information may become further apparent upon review of the following detailed description.

BRIEF DESCRIPTION OF THE DRAWINGS

Various non-limiting embodiments are further described with reference to the accompanying drawings in which.

DETAILED DESCRIPTION

Figure 1:
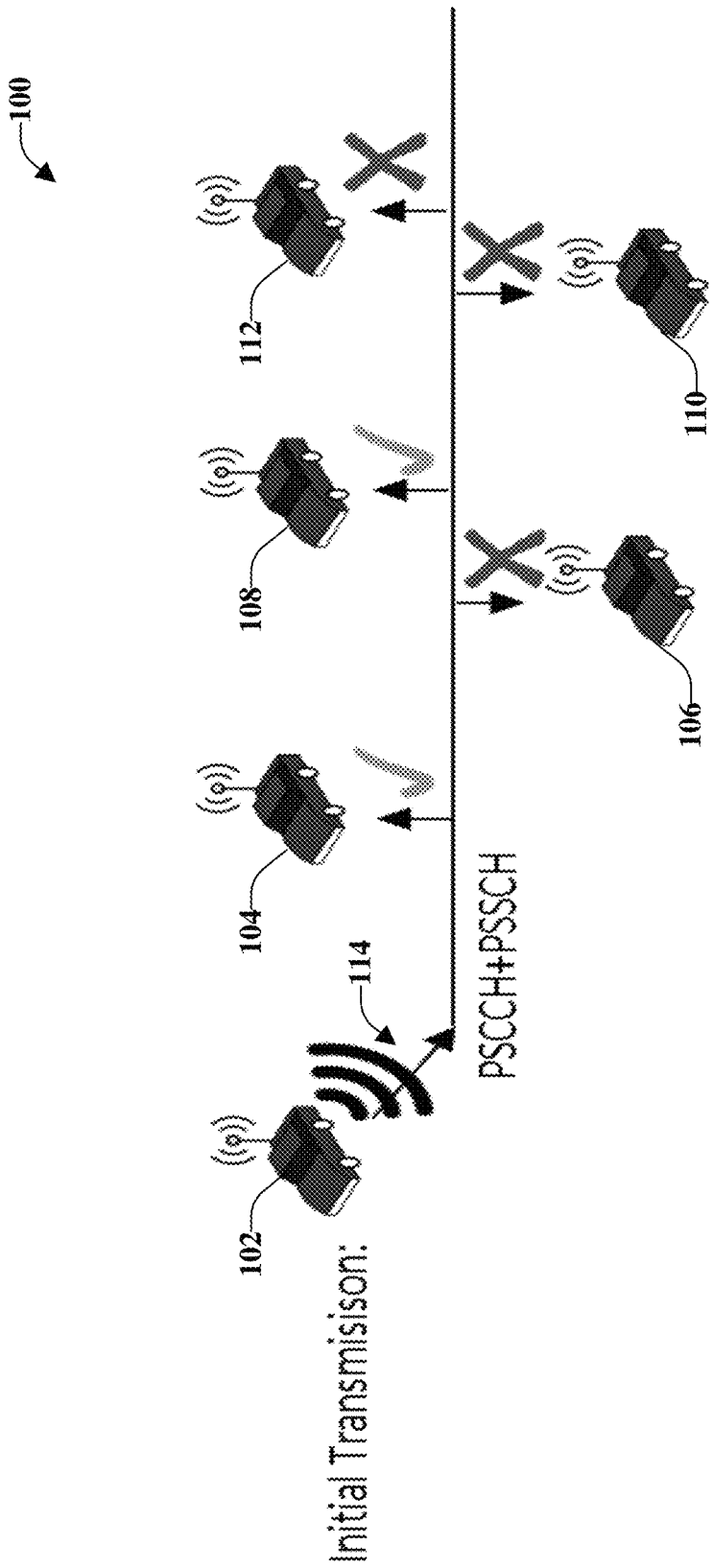
FIG. 1 illustrates an example, non-limiting, schematic system block diagram of an initial transmission of a vehicle to everything communication in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

As an overview, various embodiments are described herein to facilitate a group Hybrid Automatic Repeat reQuest (HARQ) procedure for New Radio (NR) sidelink communication for a 5G air interface, 6G, or other next generation networks. In further detail, the various embodiments can enable vehicle to everything (V2X) services in 5G NR networks, or other advanced networks. More specifically, the various embodiments relate to group based HARQ procedure to support highly reliable communications on the group cast or multi-cast in NR Sidelink.

The various aspects can support group cast according to a sidelink design. For group case, messages can be sent to a defined group of users instead of to a single user (unicast) or to all users that can receive the transmission (broadcast). Thus, in group cast, the intended receiver is only within the defined group of users.

To reduce the Physical Sidelink Feedback Channel (PSFCH) resource usage, a Negative Acknowledgement (NAK) only solution can be implemented. Essentially a NAK only solution is to have all User Equipment devices (UEs) in the same group share only one PSFCH to perform HARQ feedback. When multiple UEs failed to decode Physical Sidelink Shared Channel (PSSCH), they can transmit NAK on the same channel From the receiver point of view, it sees a combination of transmitted PSFCH from multiple UEs (SFN transmission).

The reason to introduce shared NAK channel is to reduce a HARQ feedback resource since there is no need to have UE specific PSFCH resources. A side effect is that it also increases the reception quality of the NAK signal since the transmission power of multiple UEs add up. However, it does not help the overall HARQ performance too much since HARQ retransmission is still from the original transmitter UE. The receiving quality of retransmitting data packet is more or less the same as the initial transmission.

Various advantages can be achieved with the disclosed aspects. For example, group based retransmission can significantly increase the successful rate of HARQ retransmission. Further, group based retransmission does not require a centralized scheduler to coordinate the retransmission. Instead, any UE initiates a data packet for group cast, which can trigger group-based retransmission. In addition, the disclosed aspects do not require additional resources because the group retransmission is based on shared feedback channel and shared PSCCH/PSSCH. Accordingly, the disclosed aspects can facilitate a high reliable HARQ retransmission procedure to increase the robustness of HARQ in group cast.

According to an embodiment, provided is a system that can comprise a processor and a memory that stores executable instructions that, when executed by the processor, facilitate performance of operations. The operations can comprise decoding a data packet received from a second device resulting in a successfully decoded data packet. The operations also can comprise receiving, from a third device, negative acknowledgement information that indicates the data packet was not successfully decoded at the third device. Further, the operations can comprise transmitting, to the third device, the successfully decoded data packet during a group hybrid automatic repeat request procedure. The first device, the second device, and the third device can be included in a defined group of devices. According to some implementations, the group hybrid automatic repeat request procedure can be configured to operate according to a fifth generation wireless network communication protocol.

The data packet can comprise sidelink control information comprising an indication to implement the group hybrid automatic repeat request procedure for the data packet. Further, the indication to implement the group hybrid automatic repeat request procedure can comprise identification of a group shared sidelink feedback channel for negative acknowledgement only hybrid automatic repeat request feedback. Alternatively, or additionally, the indication to implement the group hybrid automatic repeat request procedure can comprise information to reserve a sidelink shared channel for retransmission.

In an example, decoding the data packet can comprise determining the data packet passed a cyclic redundancy check examination, resulting in the successfully decoded data packet.

According to some implementations, decoding the data packet can comprise decoding sidelink control information that comprises a first designated resource of a sidelink control channel and a second designated resource of a sidelink shared channel. Further, transmitting the successfully decoded data packet during the group hybrid automatic repeat request procedure can comprise transmitting sidelink control information via the sidelink control channel at the first designated resource. Further, the successfully decoded data packet can be transmitted via the sidelink shared channel at the second designated resource.

In some implementations, transmitting the successfully decoded data packet during the group hybrid automatic repeat request procedure can be performed concurrently with a retransmission of the data packet by the second device. According to some implementations, the operations can comprise, after decoding the data packet, sending the successfully decoded data packet to a network device such that a transmission of the data packet to the first device is completed. Further, according to some implementations, receiving the negative acknowledgement information can comprise attempting to receive a shared sidelink feedback channel indicated in sidelink control information included in the successfully decoded data packet.

Another embodiment can relate to a method that can comprise determining, by a first device comprising a processor, that first information received via a sidelink control channel is successfully decoded and that second information received via a sidelink shared channel is not successfully decoded. The first information and the second information can be received from a second device. Further, the method can comprise transmitting, by the first device, negative acknowledgement data on an indicated feedback channel based on a group hybrid automatic repeat request feedback procedure. The method also can comprise receiving, by the first device, retransmission of the second information via the sidelink shared channel from a group of devices in response to the negative acknowledgement data.

According to some implementations, determining that the second information is not successfully decoded can comprise determining the second information failed a cyclic redundancy check examination. Further to these implementations, the method can comprise, after transmitting the negative acknowledgement data, retaining, by the first device, soft symbols of the second information in a data store. Further to these implementations, the method can comprise, prior to receiving the retransmission of the second information, receiving, by the first device, a hybrid automatic repeat request retransmission.

In some implementations, the method can comprise receiving, by the first device, a retransmission of the second information in response to the negative acknowledgement data. The retransmission of the second information can be received from the second device and the third device. The second device can be an original transmitter of the second information. The third device previously successfully decoded the second information. Further to these implementations, the first information can comprise sidelink control information comprising an indication to implement a group hybrid automatic repeat request procedure.

According to some implementations, the negative acknowledgement data is first negative acknowledgement data and the method can comprise determining, by the first device, the retransmission of the second information is successfully decoded, resulting in decoded second information. The method also can comprise sending, by the first device, the decoded second information to a network device such that a transmission of the second information to the first device is completed. Further, the method can comprise participating, by the first device, in a group hybrid automatic repeat request procedure based on receipt of second negative acknowledgement data from a fourth device included in the group of devices.

In some implementations, the negative acknowledgement data can be first negative acknowledgement data, and the method can comprise determining, by the first device, the retransmission of the second information is successfully decoded, resulting in decoded second information. The method also can comprise receiving, from a fourth device, second negative acknowledgement data that indicates the second information was not successfully decoded at the fourth device. Further, the method can comprise transmitting, to the fourth device, the decoded second information during a group hybrid automatic repeat request procedure.

Another embodiment can relate to a machine-readable storage medium, comprising executable instructions that, when executed by a processor, facilitate performance of operations. The operations can comprise receiving a data packet from a first device, wherein the data packet comprises sidelink control information that indicates activation of a group retransmission, a group shared physical shared channel for negative acknowledgement only hybrid automatic repeat request feedback, and a sidelink shared channel resource reserved for retransmission. The operations also can comprise transmitting the data packet to a second device based on successful decoding of the data packet and receipt of a negative acknowledgment from the second device.

According to some implementations, transmitting the data packet to the second device can comprise retransmitting the sidelink control information via a physical shared control channel at a first resource defined by the sidelink control information. Further, the operations can comprise transmitting the data packet on a physical shared sidelink control channel via a second resource defined by the sidelink control information.

In accordance with some implementations, transmitting the data packet to the second device can comprise transmitting the data packet during a group hybrid automatic repeat request retransmission attempt.

More specifically, described herein are systems, methods, articles of manufacture, and other embodiments or implementations that can enable vehicle to everything (V2X) services in advanced network (e.g., 5G NR networks, and so on). Further, the one or more aspects relate to a group based HARQ procedure to support highly reliable communications on the group-cast or multi-cast in new radio sidelink communication for a 5G, 6G, or other next generation network, air interface.

Vehicle to everything (V2X) services can comprise vehicle-to-infrastructure (V2I) communications between vehicles and base station devices (e.g. gNodeBs) or roadside access point units, and vehicle-to-vehicle (V2V) communications which may be over the existing cellular (Uu) interface or a Sidelink (e.g. D2D or PC5) interface.

Sidelink resource allocation can operate by having the base station device perform resource allocation and feedback using cellular Uu signaling and protocols (referred to as Mode 1 in the 3GPP standard). The base station device sends a downlink control message (DCI) to the transmitting V2X user equipment (referred to as Node-T) indicating the Sidelink resources that can be used. The Node-T then sends a Sidelink control information (SCI) message along with the broadcast/groupcast/unicast data to the receiving V2X user equipment(s) (referred to as Node-R). Based on whether the reception of the data was successful or not, the Node-R sends ACK/NACK feedback to the base station device using an uplink control message (UCI), which is used to manage subsequent resource allocation decisions.

Another type of Sidelink resource allocation has a V2X user equipment schedule a Node-T to Node-R transmission (other instead of a base station or other infrastructure node (termed Mode 2D in 3GPP). To achieve the resulting three-party communication system, a User Equipment device (UE) can be appointed as a V2X local manager (sometimes referred to as a scheduler Node-S), which coordinates the resources used by the associated transmitting user equipment (Node-T) and receiving user equipment(s) (Node-R).

NR sidelink should support broadcast, group cast and unicast. Groupcast is a application where NR sidelink can be differentiated from LTE sidelink. A group of UEs is formed so the information can be communicated within the group. A UE can transmit data packet to all the UEs the in the group. The typical use case is a group of UEs traveling in the same direction, which can form a platoon.

Referring initially to FIG. 1, illustrated is an example, non-limiting, schematic system block diagram 100 of an initial transmission of a V2X communication in accordance with one or more embodiments described herein.

As illustrated, V2X services can comprise both vehicle-to-vehicle (V2V) communication between a defined group of vehicles comprising respective communication devices. In the example of FIG. 1, six vehicles are illustrated (e.g., a first vehicle 102, a second vehicle 104, a third vehicle 106, a fourth vehicle 108, a fifth vehicle 110, and a sixth vehicle 112). It is noted, however that fewer than six vehicles or more than six vehicles can be utilized with the disclosed aspects. The V2V communication between the vehicles can be, for example, over an existing cellular (Uu) interface or a sidelink (e.g., D2D or PC5) interface.

The first vehicle 102 can transmit a communication or data packet (e.g., a transmission 114), which can be transmitted to the other vehicles in the group of vehicles (e.g., the second vehicle 104, the third vehicle 106, the fourth vehicle 108, the fifth vehicle 110, and the sixth vehicle 112). Thus, the first vehicle 102 can be referred to as an original transmitter of the transmission 114 and the transmission 114 can be referred to as an original transmission. The transmission 114 can be a data packet transmitted using a Physical Sidelink Control Channel (PSCCH) plus Physical Sidelink Shared Channel (PSSCH) framework.

The transmission can be a transmission for which it is desired to improve reliability so that all recipients of the transmission successfully decode the transmission. Accordingly, there can be HARQ feedback involved for the transmission 114. In addition, there can be other transmissions for which HARQ feedback is not required.

In the example of FIG. 1, the second vehicle 104 and the fourth vehicle 108 can successfully decode the transmission 114 (as indicated by the checkmarks). Further, the third vehicle 106, the fifth vehicle 110, and the sixth vehicle 112 did not successfully decode the transmission (as indicated by the X's).

Figure 2:
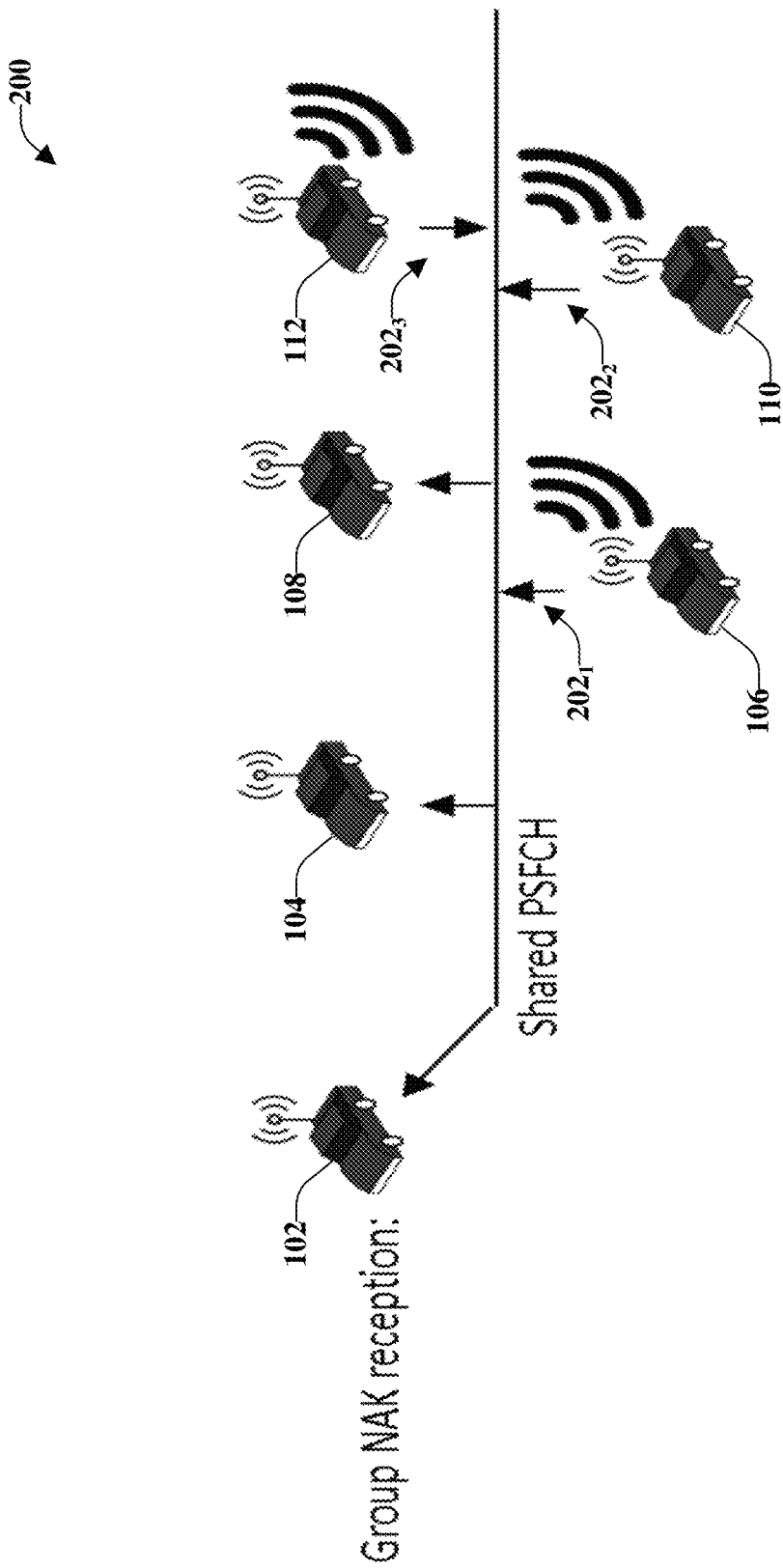
FIG. 2 illustrates an example, non-limiting, schematic system block diagram of a group negative acknowledgement reception in response to the transmission of FIG. 1 in accordance with one or more embodiments described herein.

FIG. 2 illustrates an example, non-limiting, schematic system block diagram 200 of a group negative acknowledgement (NAK) reception in response to the transmission of FIG. 1 in accordance with one or more embodiments described herein. Repetitive description of like elements employed in other embodiments described herein is omitted for sake of brevity.

Since the third vehicle 106, the fifth vehicle 110, and the sixth vehicle 112 did not successfully decode the transmission, these vehicles can transmit respective NAK feedbacks, indicated by $202_1$, $202_2$, and $202_3$, to the original transmitter (e.g., the first vehicle 102). The second vehicle 104 and the fourth vehicle 108 do not need to transmit an acknowledgement of successful receipt of the transmission 114 in accordance with the disclosed aspects (e.g., a NAK only feedback).

In contrast, if non-group HARQ feedback were implemented, each vehicle (or user device) would feedback an ACK or a NAK on different channels. Thus, if there are N users in the group, then N channels would be needed, which is a large resource overhead since a majority of the users might have received the transmission correctly. Accordingly, for optimization, there is a NAK only channel, where if the transmission is correctly decoded, there is no need to send anything. However, if not successfully decoded, the NAK is sent. Further, the group can share a single channel for the NAK because, from the original transmitter's perspective, the moment a NAK is received (e.g., the first received NAK), the original transmitter starts to retransmit.

However, for non-group retransmission, the retransmission is still being sent by the same transmitter, who initiated the first transmission. Therefore, the overall HARQ performance can be improved a little bit, but not enough. Accordingly, the disclosed aspects provide a high reliability group HARQ procedure. Thus, not only the original transmitter will transmit the same packet again, but other UEs within the group that decoded the packet correctly (initial transmission), for the retransmission, will try to transmit. Therefore, the total energy of the retransmission is several times higher than before because the different UEs have different locations so the total effective spreading area is much larger.

Further, according to the various aspects discussed herein, since the second vehicle 104 and the fourth vehicle 108 successfully decoded the transmission 114, the vehicles also listen for the NAK feedback from the other vehicles in the defined group.

Thus, the NAK from at least one of the third vehicle 106, the fifth vehicle 110, and the sixth vehicle 112 can be received by the first vehicle 102 and also the second vehicle 104 and the fourth vehicle 108. The NAK feedback can be transmitted via a shared PSFCH.

Figure 3:
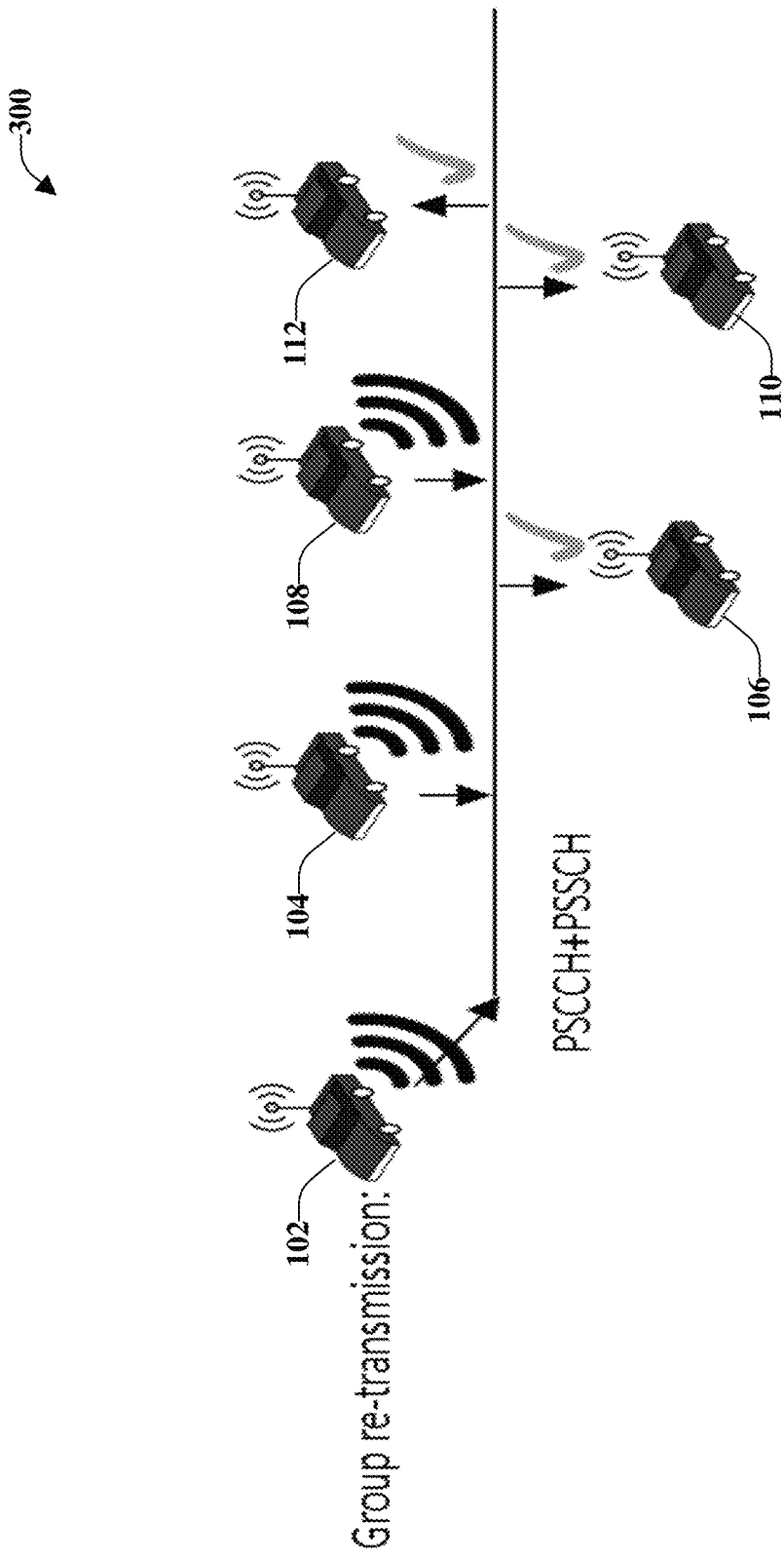
FIG. 3 illustrates an example, non-limiting, schematic system block diagram of a group retransmission in response to the group negative acknowledgement reception of FIG. 2 in accordance with one or more embodiments described herein.

FIG. 3 illustrates an example, non-limiting, schematic system block diagram 300 of a group retransmission in response to the group negative acknowledgement (NAK) reception of FIG. 2 in accordance with one or more embodiments described herein. Repetitive description of like elements employed in other embodiments described herein is omitted for sake of brevity.

For the group retransmission, the original transmission (e.g., transmission 114) can be resent by the first vehicle 102. In addition, the original transmission, as decoded by the second vehicle 104 and the fourth vehicle 108, can be transmitted by the second vehicle 104 and the fourth vehicle 108. In the example, of FIG. 3, the retransmission can be successfully decoded by the third vehicle 106, the fifth vehicle 110, and the sixth vehicle 112.

Figure 4:
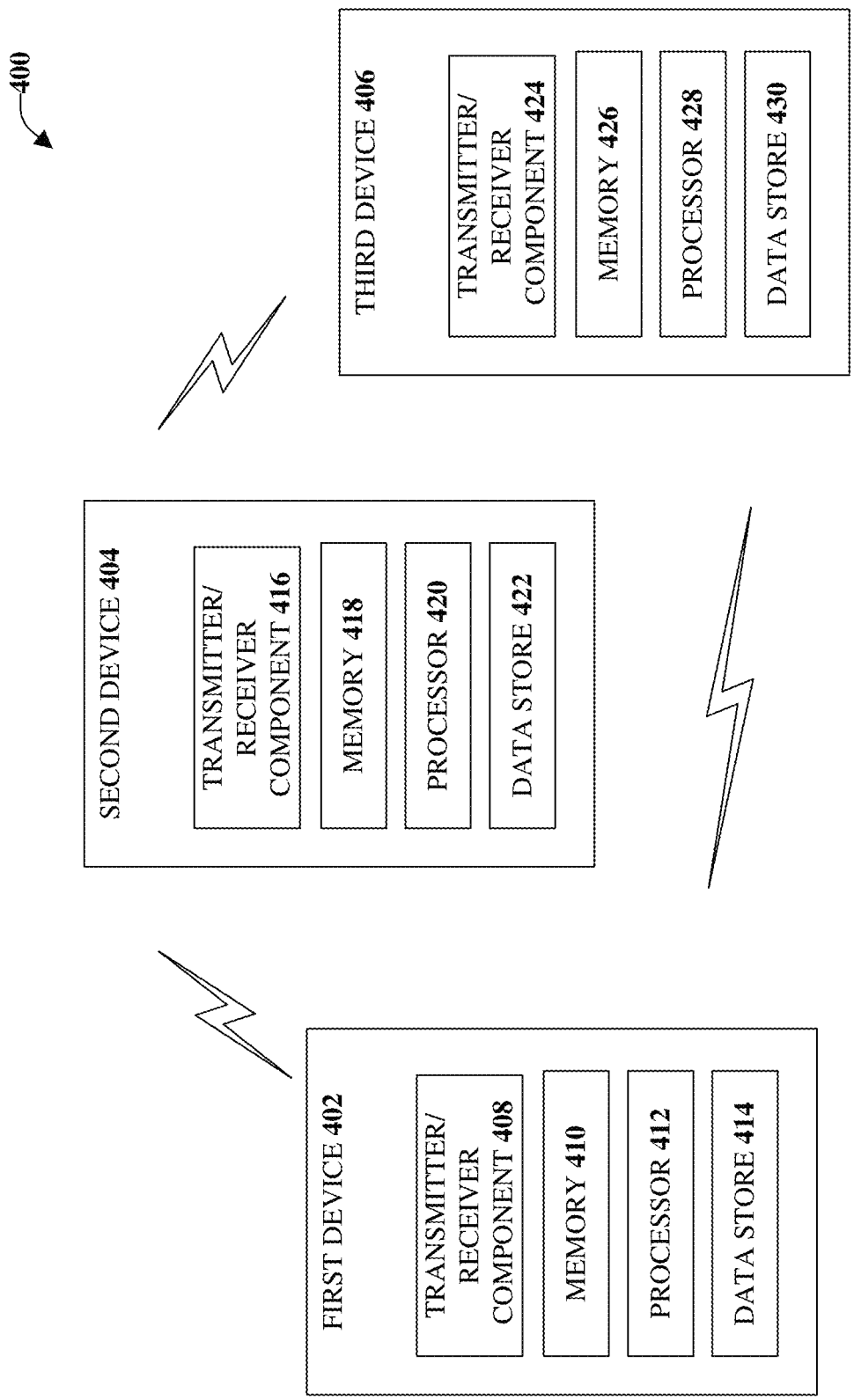
FIG. 4 illustrates an example, non-limiting, system that facilitates a group hybrid automatic repeat request procedure in accordance with one or more embodiments described herein.

FIG. 4 illustrates an example, non-limiting, system 400 that facilitates a group hybrid automatic repeat request procedure in accordance with one or more embodiments described herein. Repetitive description of like elements employed in other embodiments described herein is omitted for sake of brevity.

Aspects of systems (e.g., the system 400 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 400 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 400 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 4, the system 400 can include a first communication device 402, a second communication device 404, and at least a third communication device 406. A defined group of devices can be configured to include the first communication device 402, the second communication device 404, and at least the third communication device 406. For example, the group of devices can be defined according to a network and/or high layer instruction.

The first communication device 402 can comprise a transmitter/receiver component 408, at least one memory 410, at least one processor 412, and at least one data store 414. The second communication device 404 can comprise a transmitter/receiver component 416, at least one memory 418, at least one processor 420, and at least one data store 422. Further, at least the third communication device 406 can comprise a transmitter/receiver component 424, at least one memory 426, at least one processor 428, and at least one data store 430.

Upon or after the first communication device 402 determines that there are some data packets which have a certain level of priority (e.g., a traffic QoS requirement that is above a threshold level), the transmitter/receiver component 408 can transmit a high reliable data packet to the group of devices (e.g., the second communication device 404, the third communication device 406). The first communication device 402 can send the data using a PSCCH+PSSCH framework. For example, the data packet can be transmitted on the PSSCH on the resource indicated in the PSCCH. According to some implementations, the traffic QoS can include, but is not limited to: high reliable data, critical system information, critical group information, and so on.

An SCI carried by the PSCCH can include all the information needed to decode PSSCH (data). Additionally, the SCI can indicate (either implicitly or explicitly) that group HARQ retransmission is required for the current data packets. In an example, the indication that the group HARQ retransmission is required can include a notice that group retransmission is on or activated. Further, the indication that the group HARQ retransmission is required can include a notice that a group shared PSFCH for NAK-only HARQ feedback is enabled. Further, the indication that the group HARQ retransmission is required can include a notice that PSSCH resource (both time and frequency) is reserved for possible re-transmission.

In additional, or alternative, implementations, the determination whether or not an individual UE can turn on group retransmission can be indicated by higher layer signaling (e.g. Medium Access Control (MAC) Control Element (CE) or Radio Resource Control (RRC)). In these implementations, the determination can be sent by a gNB or a Local Manger entity providing configurations for the group of devices.

It is noted that not all transmissions need the group HARQ retransmission. For example, some data packets do not need such a high reliability and, therefore, the group HARQ retransmission is not indicated, which can conserve battery power on the devices participating in the group HARQ retransmission.

The second communication device 404 and the third communication device 406 can receive the PSCCH transmitted by the first communication device (e.g., via the transmitter/receiver component 416 and the transmitter/receiver component 424, respectively). The PSCCH can be a fixed location channel wherein the receiver can decode it and derive the sidelink control information, which can include all the information needed to ecode the data channel (e.g., the PSSCH). For purposes of explanation, the second communication device 404 fails to successfully decode the data packet. For example, the second communication device 404 could decoded the PSCCH correctly but could fail to decode PSSCH. Thus, the second communication device 404 can determine that a Cyclic Redundancy Check (CRC) examination of the PSSCH failed. In addition, for purposes of explanation, the third communication device 406 successfully decodes the data packet. For example, the third communication device 406 could successfully decode the PSCCH and the PSSCH. Accordingly, the third communication device 406 can determine the data packet passed a CRC examination, resulting in a successfully decoded data packet.

Accordingly, the second communication device 404 can, via the transmitter/receiver component 416 send negative acknowledgement data (NAK) in a shared PSFCH indicated in SCI to request retransmission. Further, the at least one processor 420 can retain the soft symbols of current PSSCH in memory (e.g., the at least one memory 418 and/or the at least one data store 422). Further, the second communication device 404 can prepare for receiving HARQ retransmission. To prepare for receiving HARQ retransmission, the second communication device 404 can prepare its channel estimator (not shown) to consider that the potential for multiple transmitters for the PSSCH retransmission since the group retransmission is turned on.

Further, the third communication device 406 can pass the successfully decoded data packet to high layer (e.g., via the transmitter/receiver component 424.) Passing the successfully decoded data packet to high layer can complete the transmission for the third communication device 406.

Further, the third communication device 406 can try to receive the shared PSFCH indicated in SCI. For example, since the second communication device 404 did not successfully decode the data packet, the third communication device 406 could receive a NAK from the second communication device 404. It is noted that the third communication device 406 does not know a priori which other devices in the group did not successfully decode the data packet.

If the third communication device 406 detects a NAK, the third communication device 406 can (re)transmit the same SCI on PSCCH at designated resource according to the SCI received (and successfully decoded) by the third communication device 406. Further, the third communication device 406 can transmit the same data packet received (and successfully decoded) by the third communication device 406. For example, the third communication device 406 can transmit the same data packet on the PSSCH at designated resource according to the SCI received by the third communication device 406. It is noted that the first communication device 402 can also retransmit the data packet, according to the HARQ retransmit procedure.

It is noted that if a NAK is not detected by the third communication device 406, there is no retransmission. Instead, the third communication device 406 can terminate the HARQ process. It is noted that if the first communication device 402 does not receive a NAK, the first communication device 402 can also terminate the HARQ process.

The transmitter/receiver components (e.g., the transmitter/receiver component 408, the transmitter/receiver component 416, the transmitter/receiver component 424) can be configured to transmit to, and/or receive data from, one another, other communication devices, and/or network devices. Through respective transmitter/receiver components, the first communication device 402, the second communication device 404, and the third communication device 406 can concurrently transmit and receive data, can transmit and receive data at different times, or combinations thereof.

The at least one memory 410 can be operatively connected to the at least one processor 412. The at least one memory 410 can store executable instructions that, when executed by the at least one processor 412 can facilitate performance of operations. Further, the at least one processor 412 can be utilized to execute computer executable components stored in the at least one memory 410 and/or the at least one data store 414.

For example, the at least one memory 410 can store protocols associated with facilitating a group hybrid automatic repeat request procedure for sidelink group-case in advanced networks as discussed herein. Further, the at least one memory 410 can facilitate action to control communication between the first communication device 402, the second communication device 404, the third communication device 406, other communication devices, and/or network devices, such that the first communication device 402 can employ stored protocols and/or algorithms to achieve improved communications in a wireless network as described herein.

Further, the at least one memory 418 can be operatively connected to the at least one processor 420. The at least one memory 418 can store executable instructions that, when executed by the at least one processor 420 can facilitate performance of operations. Further, the at least one processor 420 can be utilized to execute computer executable components stored in the at least one memory 418 and/or the at least one data store 422.

For example, the at least one memory 418 can store protocols associated with facilitating a group hybrid automatic repeat request procedure for sidelink group-case in advanced networks as discussed herein. Further, the at least one memory 418 can facilitate action to control communication between the second communication device 404, the first communication device 402, the third communication device 406, other communication devices, and/or network devices, such that the second communication device 404 can employ stored protocols and/or algorithms to achieve improved communications in a wireless network as described herein.

Additionally, the at least one memory 426 can be operatively connected to the at least one processor 428. The at least one memory 426 can store executable instructions that, when executed by the at least one processor 428 can facilitate performance of operations. Further, the at least one processor 428 can be utilized to execute computer executable components stored in the at least one memory 426 and/or the at least one data store 430.

For example, the at least one memory 426 can store protocols associated with facilitating a group hybrid automatic repeat request procedure for sidelink group-case in advanced networks as discussed herein. Further, the at least one memory 426 can facilitate action to control communication between the third communication device 406, the first communication device 402, the second communication device 404, other communication devices, and/or network devices, such that the third communication device 406 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 412 can facilitate respective analysis of information related to a group hybrid automatic repeat request procedure for sidelink group-case in advanced networks. The at least one processor 412 can be a processor dedicated to analyzing and/or generating information received, a processor that controls one or more components of the first communication device 402, and/or a processor that both analyzes and generates information received and controls one or more components of the first communication device 402.

In addition, the at least one processor 420 can facilitate respective analysis of information related to a group hybrid automatic repeat request procedure for sidelink group-case in advanced networks. The at least one processor 420 can be a processor dedicated to analyzing and/or generating information received, a processor that controls one or more components of the second communication device 404, and/or a processor that both analyzes and generates information received and controls one or more components of the second communication device 404.

Additionally, the at least one processor 428 can facilitate respective analysis of information related to a group hybrid automatic repeat request procedure for sidelink group-case in advanced networks. The at least one processor 428 can be a processor dedicated to analyzing and/or generating information received, a processor that controls one or more components of the third communication device 406, and/or a processor that both analyzes and generates information received and controls one or more components of the third communication device 406.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
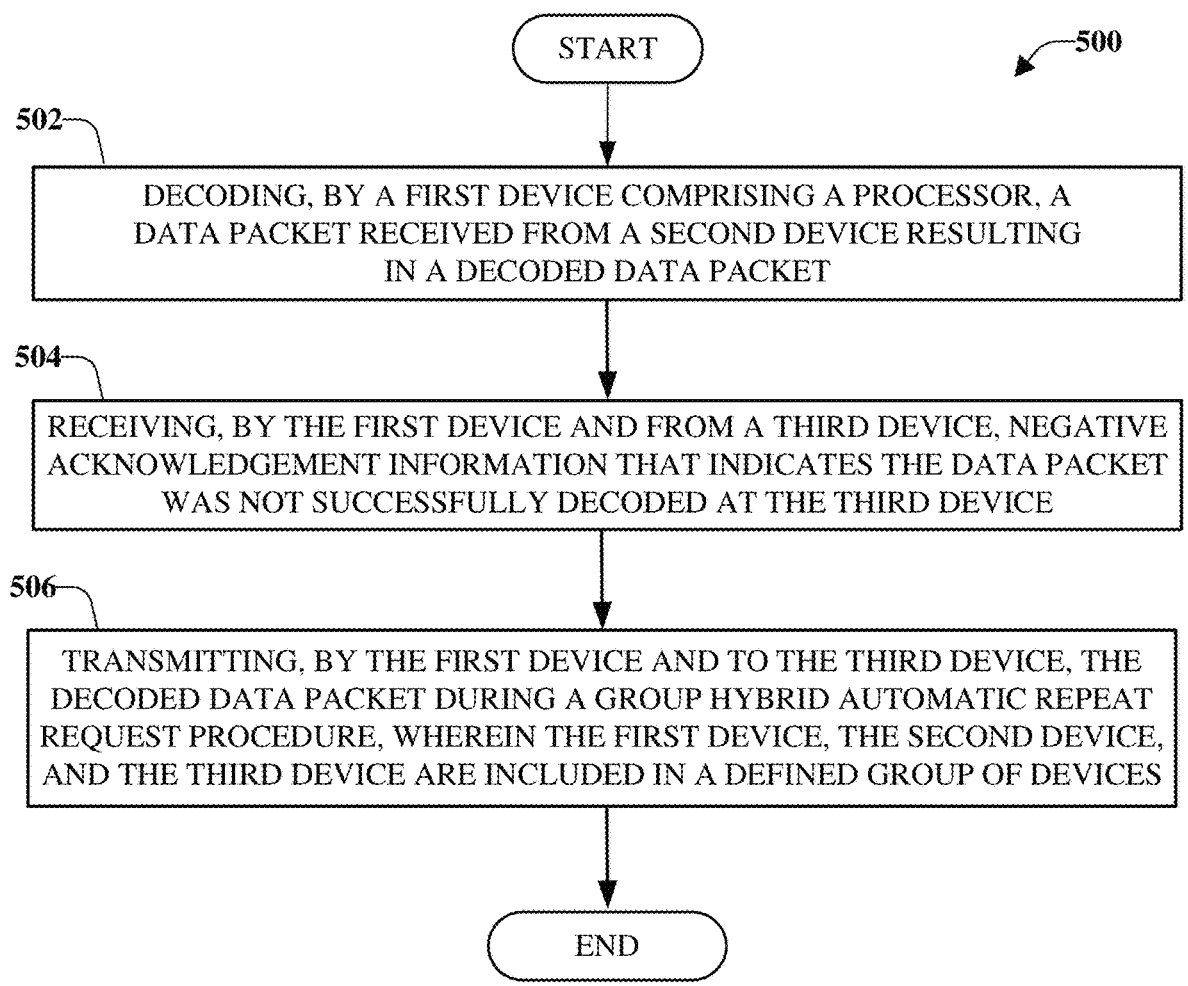
FIG. 5 illustrates a flow diagram of an example, non-limiting, computer-implemented method for participating in a group hybrid automatic repeat request procedure in advanced networks in accordance with one or more embodiments described herein.

FIG. 5 illustrates a flow diagram of an example, non-limiting, computer-implemented method 500 for participating in a group hybrid automatic repeat request procedure in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a first device can decode a data packet received from a second device. Decoding the data packet can result in a successfully decoded data packet at the first device. For example, decoding the data packet can comprise determining the data packet passed a CRC examination, resulting in the successfully decoded data packet.

The data packet can comprise sidelink control information comprising an indication to implement a group hybrid automatic repeat request procedure for the data packet. For example, the indication to implement the group hybrid automatic repeat request procedure can comprise identification of a group shared sidelink feedback channel for negative acknowledgement only hybrid automatic repeat request feedback. In another example, the indication to implement the group hybrid automatic repeat request procedure can comprise information to reserve a sidelink shared channel for retransmission.

Further, at 504 of the computer-implemented method 500, the first device can receive from a third device, negative acknowledgement information that indicates the data packet was not successfully decoded at the third device.

The first device can transmit, to the third device the successfully decoded data packet during a group hybrid automatic repeat request procedure, at 506 of the computer-implemented method 500. The first device, the second device, and the third device can be included in a defined group of devices. For example, the group of devices can be formed according to a network instruction and/or a higher layer instruction.

According to some implementations, decoding the data packet can comprise decoding sidelink control information that comprises a first designated resource of a sidelink control channel and a second designated resource of a sidelink shared channel. Further, transmitting the successfully decoded data packet during the group hybrid automatic repeat request procedure can comprise transmitting the sidelink control information via the sidelink control channel at the first designated resource. In addition, transmitting the successfully decoded data packet during the group hybrid automatic repeat request procedure can comprise transmitting the successfully decoded data packet via the sidelink shared channel at the second designated resource.

In an example, transmitting the successfully decoded data packet during the group hybrid automatic repeat request procedure can be performed concurrently with a retransmission of the data packet by the second device. Thus, rather than simply receiving the data packet from the original transmitter (e.g., the second device), the third device can receive the data packet, during the retransmission, from the first device and other devices in the group that successfully decoded the data packet.

According to some implementations, after decoding the data packet, the first device can send the successfully decoded data packet to a network device such that a transmission of the data packet to the first device is completed. Further, in some implementations, receiving the negative acknowledgement information can comprise attempting to receive a shared sidelink feedback channel indicated in sidelink control information included in the successfully decoded data packet. In some implementations, the group hybrid automatic repeat request procedure can be configured to operate according to a fifth generation wireless network communication protocol.

Figure 6:
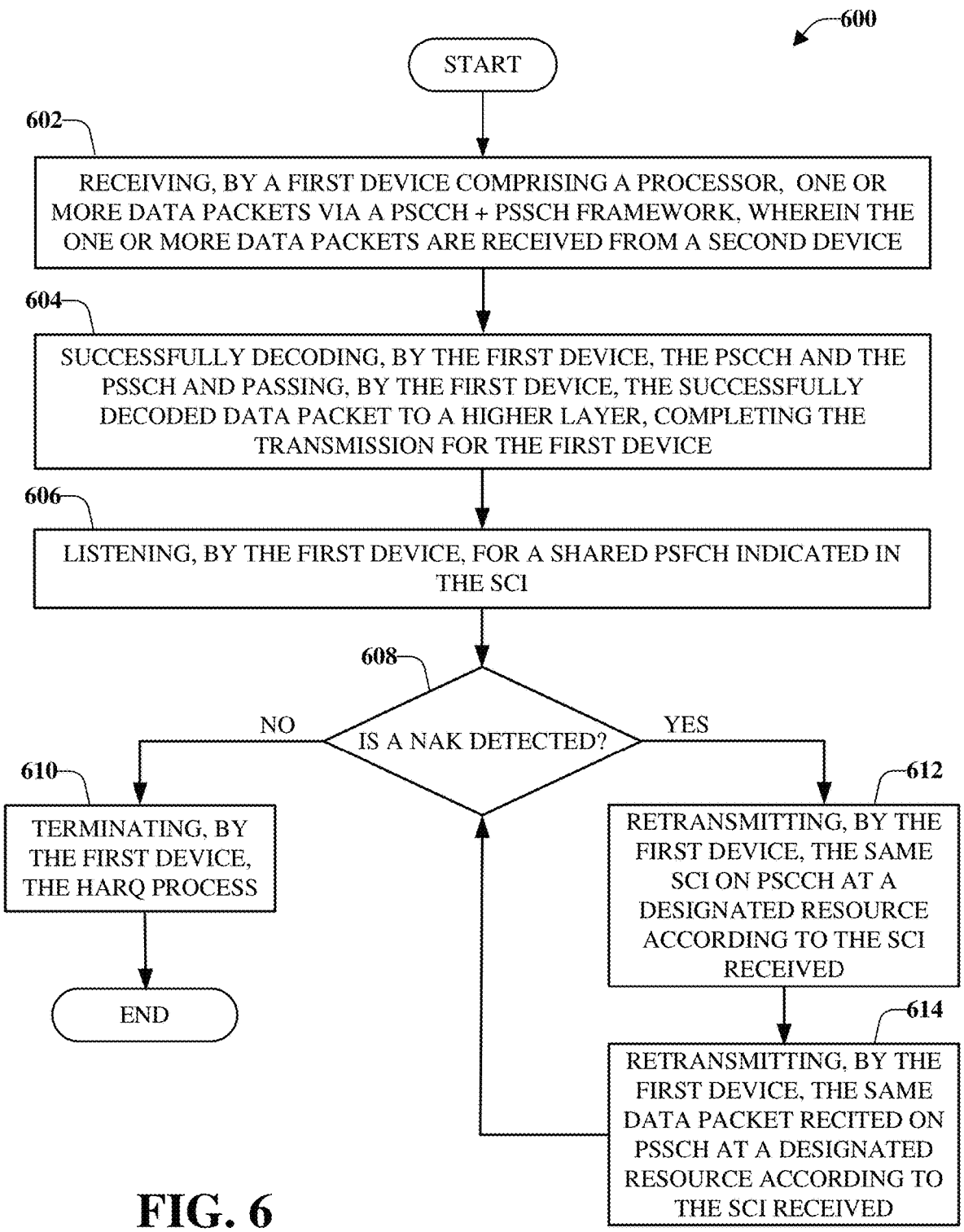
FIG. 6 illustrates a flow diagram of an example, non-limiting, computer-implemented method for receiving data and retransmitting the data based on a group hybrid automatic repeat request procedure in advanced networks in accordance with one or more embodiments described herein.

FIG. 6 illustrates a flow diagram of an example, non-limiting, computer-implemented method 600 for receiving data and retransmitting the data based on a group hybrid automatic repeat request procedure in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a first device can receive one or more data packets via a PSCCH+PSSCH framework. The one or more data packets can be received from a second device (e.g., an original transmitter of the one or more data packets). The PSCCH can comprise a SCI that includes the information needed to decode the PSSCH (e.g., data). The data packet can be transmitted on the PSSCH on the resource indicated in PSCCH.

Further, the SCI can indicate (either implicitly or explicitly) that group HARQ retransmission is required for the current data packets. The indication can include a notice that group retransmission is on, an indication that group shared PSFCH for NAK-only HARQ feedback is active, and a PSSCH resource (both time and frequency) is reserved for possible retransmission (e.g., during a group retransmission procedure). Alternatively, the indication of whether or not an individual device can turn on group retransmission can be indicated by higher layer signaling (e.g., MAC CE, RRC, and so on) send by a gNB, local manager entity, or another network device that is providing configurations for the group.

At 604, the first device can successfully decode the PSCCH and the PSSCH and can pass the successfully decoded data packet to a higher layer, completing the transmission for the first device. Further, at 606, the first device can listen for a shared PSFCH indicated in the SCI and a determination can be made, at 608 of the computer-implemented method 600 whether a NAK is detected.

If a NAK is not detected ("NO"), it indicates that there were no devices in the group of devices that failed to successfully decode the PSCCH and the PSSCH. Therefore, the computer-implemented method 600 continues, at 610, and the first device terminates the HARQ process. Accordingly, there is no retransmission performed by the first device and the computer-implemented method 600 ends.

Alternatively, if it is determined at 608 that a NAK is detected ("YES"), at 612 the first device can retransmit the same SCI on PSCCH at a designated resource according to the SCI received. In addition, at 614, the first device can retransmit the same data packet recited on PSSCH at a designated resource according to the SCI received. The computer-implemented method 600 can return to 608 and make another determination whether another NAK is received (e.g., are there more devices in the group that have still not successfully decoded the PSCCH and the PSSCH?). This process can repeat until there is no NAK received or until a defined number of HARQ retransmissions have been reached.

Figure 7:
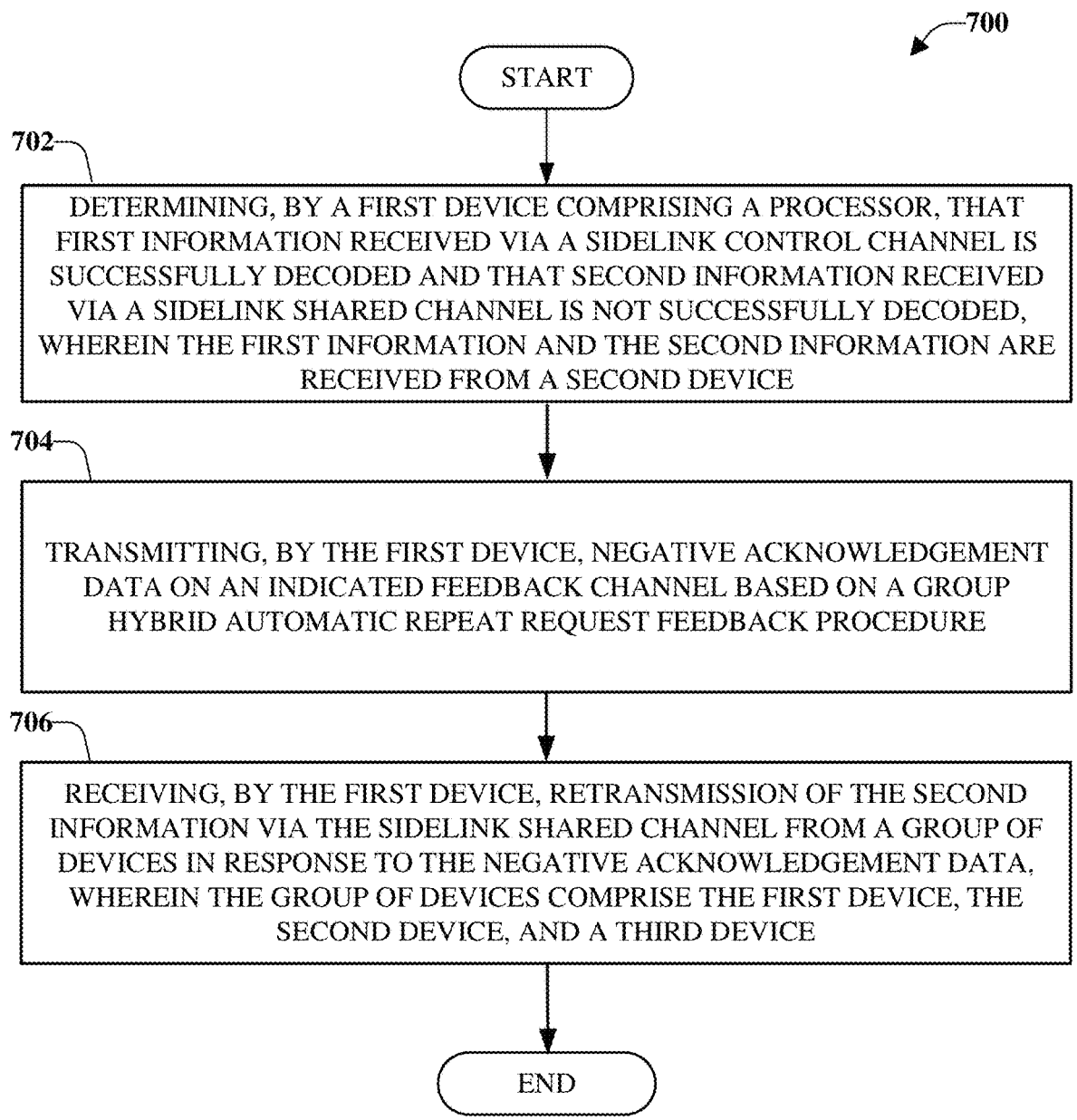
FIG. 7 illustrates a flow diagram of an example, non-limiting, computer-implemented method for receiving a group retransmission during a group hybrid automatic repeat request procedure in advanced networks in accordance with one or more embodiments described herein.

FIG. 7 illustrates a flow diagram of an example, non-limiting, computer-implemented method 700 for receiving a group retransmission during a group hybrid automatic repeat request procedure in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a first device comprising a processor can determine that first information received via a sidelink control channel is successfully decoded and that second information received via a sidelink shared channel is not successfully decoded. The first information and the second information can be received from a second device. For example, the first device can determine that the second information failed a CRC examination.

Negative acknowledgement data can be transmitted by the first device, at 704, based on a group hybrid automatic repeat request feedback procedure. The negative acknowledgement data can be transmitted on an indicated feedback channel. For example, the group hybrid automatic repeat request feedback procedure can indicate that it is a NAK only hybrid automatic repeat request feedback procedure. Thus, if the second information is successfully decoded, feedback is not necessary.

Further, at 706 of the computer-implemented method 700, the first device can receive retransmission of the second information via the sidelink shared channel from a group of devices in response to the negative acknowledgement data. The group of devices can comprise the first device, the second device, and a third device.

According to some implementations, the computer-implemented method 700 can comprise, after transmitting the negative acknowledgement data, retaining, by the first device, soft symbols of the second information in a data store. Further to these implementations, the computer-implemented method 700 can comprise, prior to receiving the retransmission of the second information, receiving, by the first device, a hybrid automatic repeat request retransmission.

In accordance with some implementations, the computer-implemented method 700 can comprise receiving, by the first device, a retransmission of the second information in response to the negative acknowledgement data. The retransmission of the second information can be received from the second device and the third device. The second device can be an original transmitter of the second information. The third device could have previously successfully decoded the second information. Further to these implementations, the first information can comprise sidelink control information comprising an indication to implement a group hybrid automatic repeat request procedure.

According to some implementations, the negative acknowledgement data can be first negative acknowledgement data. Further to these implementations, the computer-implemented method 700 can comprise determining, by the first device, the retransmission of the second information is successfully decoded, resulting in decoded second information. Further, the first device can send the decoded second information to a network device such that a transmission of the second information to the first device is completed. In addition, according to these implementations, the first device can participate in a group hybrid automatic repeat request procedure based on receipt of second negative acknowledgement data from a fourth device included in the group of devices.

In accordance with some implementations, the negative acknowledgement data can be first negative acknowledgement data and the computer-implemented method 700 can comprise determining, by the first device, the retransmission of the second information is successfully decoded, resulting in decoded second information. Further, the computer-implemented method 700 can comprise receiving, from a fourth device, second negative acknowledgement data that indicates the second information was not successfully decoded at the fourth device. In addition, the first device can transmit the decoded second information during a group hybrid automatic repeat request procedure, wherein the group of devices further comprises the fourth device.

Figure 8:
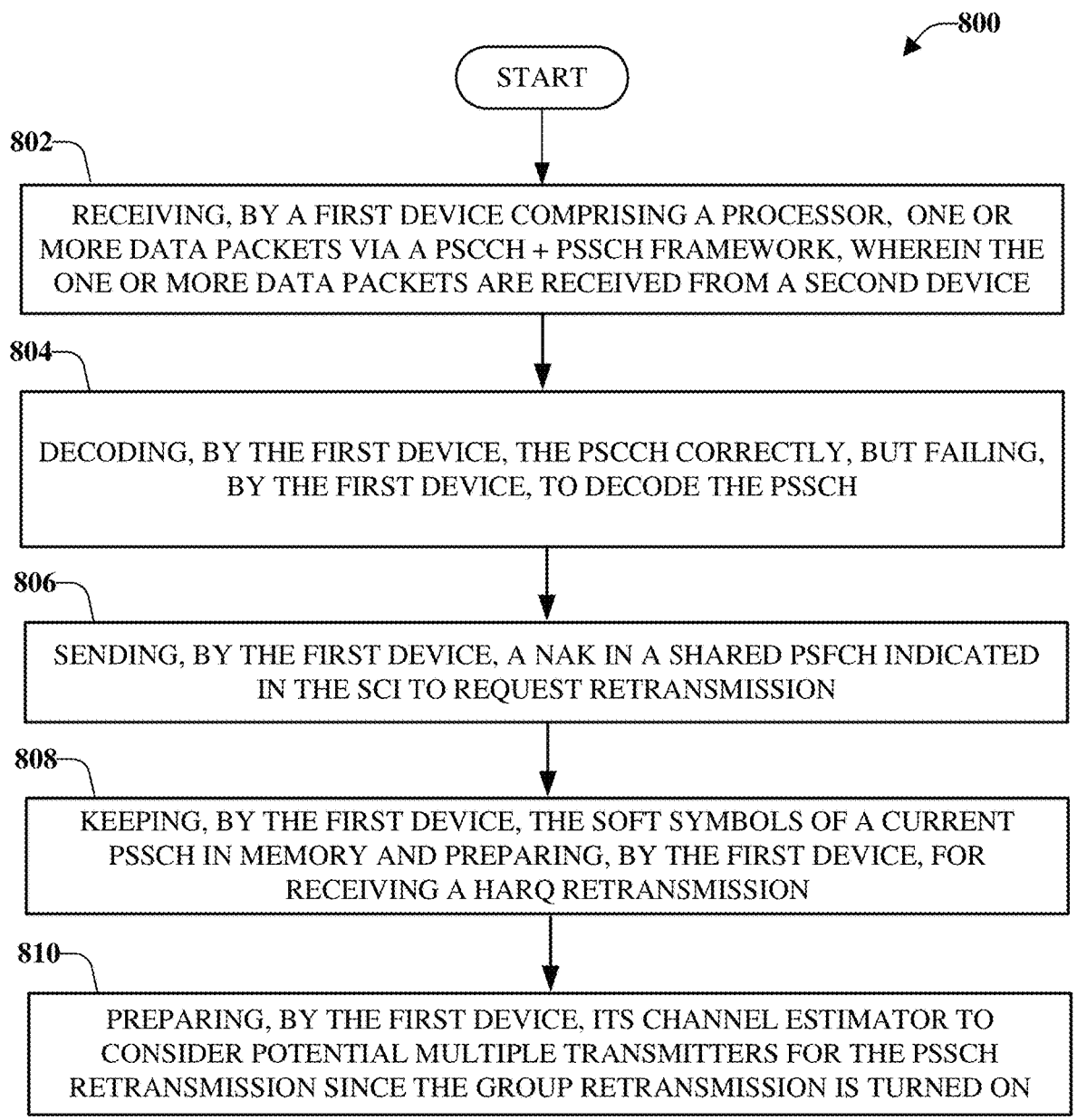
FIG. 8 illustrates a flow diagram of an example, non-limiting, computer-implemented method for receiving a group hybrid automatic repeat request retransmission in accordance with one or more embodiments described herein.

FIG. 8 illustrates a flow diagram of an example, non-limiting, computer-implemented method 800 for receiving a group hybrid automatic repeat request retransmission in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, a first device can receive one or more data packets via a PSCCH+PSSCH framework. The one or more data packets can be received from a second device (e.g., an original transmitter of the one or more data packets). The PSCCH can comprise a SCI that includes the information needed to decode the PSSCH (e.g., data). The data packet can be transmitted on the PSSCH on the resource indicated in PSCCH.

Further, the SCI can indicate (either implicitly or explicitly) that group HARQ retransmission is required for the current data packets. The indication can include a notice that group retransmission is on, an indication that group shared PSFCH for NAK-only HARQ feedback is active, and a PSSCH resource (both time and frequency) is reserved for possible retransmission (e.g., during a group retransmission procedure). Alternatively, the indication of whether or not an individual device can turn on group retransmission can be indicated by higher layer signaling (e.g., MAC CE, RRC, and so on) send by a gNB, local manager entity, or another network device that is providing configurations for the group.

At 804 of the computer-implemented method 800, the first device can decode the PSCCH correctly, but fail to decode the PSSCH. Accordingly, at 806, a NAK can be sent, by the first device, in a shared PSFCH indicated in the SCI to request retransmission.

Further, at 808, the first device can keep the soft symbols of a current PSSCH in memory and can prepare for receiving a HARQ retransmission. To prepare for receiving HARQ retransmission, the first device can prepare its channel estimator (not shown) to consider that the potential for multiple transmitters for the PSSCH retransmission since the group retransmission is activated.

In addition, at 810 of the computer-implemented method 800, the first device can prepare its channel estimator to consider potential multiple transmitters for the PSSCH retransmission since the group retransmission is turned on.

Upon or after the first device is able to successfully decode the retransmission, the first device can be included in a group retransmission procedure as discussed with respect to FIG. 5 and/or FIG. 6.

Described herein are systems, methods, articles of manufacture, and other embodiments or implementations that can facilitate a group hybrid automatic repeat request procedure for sidelink group-case in advanced networks. Facilitating a group hybrid automatic repeat request procedure for sidelink group-case can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), a Remote Radio Head (RRH), nodes in Distributed Antenna System (DAS) etc.

The various aspects described herein can relate to New Radio (NR), which can be deployed as a standalone radio access technology or as a non-standalone radio access technology assisted by another radio access technology, such as Long Term Evolution (LTE), for example.

It should be noted that although various aspects and embodiments have been described herein in the context of 5G, 6G, Universal Mobile Telecommunications System (UMTS), and/or Long Term Evolution (LTE), or other next generation networks, the disclosed aspects are not limited to 5G, 6G, a UMTS implementation, and/or an LTE implementation as the disclosed aspects can also be applied in 3G, 4G, 5G, 6G, or LTE systems. For example, aspects or features of the disclosed embodiments can be exploited in substantially any wireless communication technology. Such wireless communication technologies can include, but are not limited to, UMTS, Code Division Multiple Access (CDMA), Wireless Fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In addition, advanced networks, such as a 6G network can be configured to provide more bandwidth than the bandwidth available in other networks (e.g., 4G network, 5G network). A 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
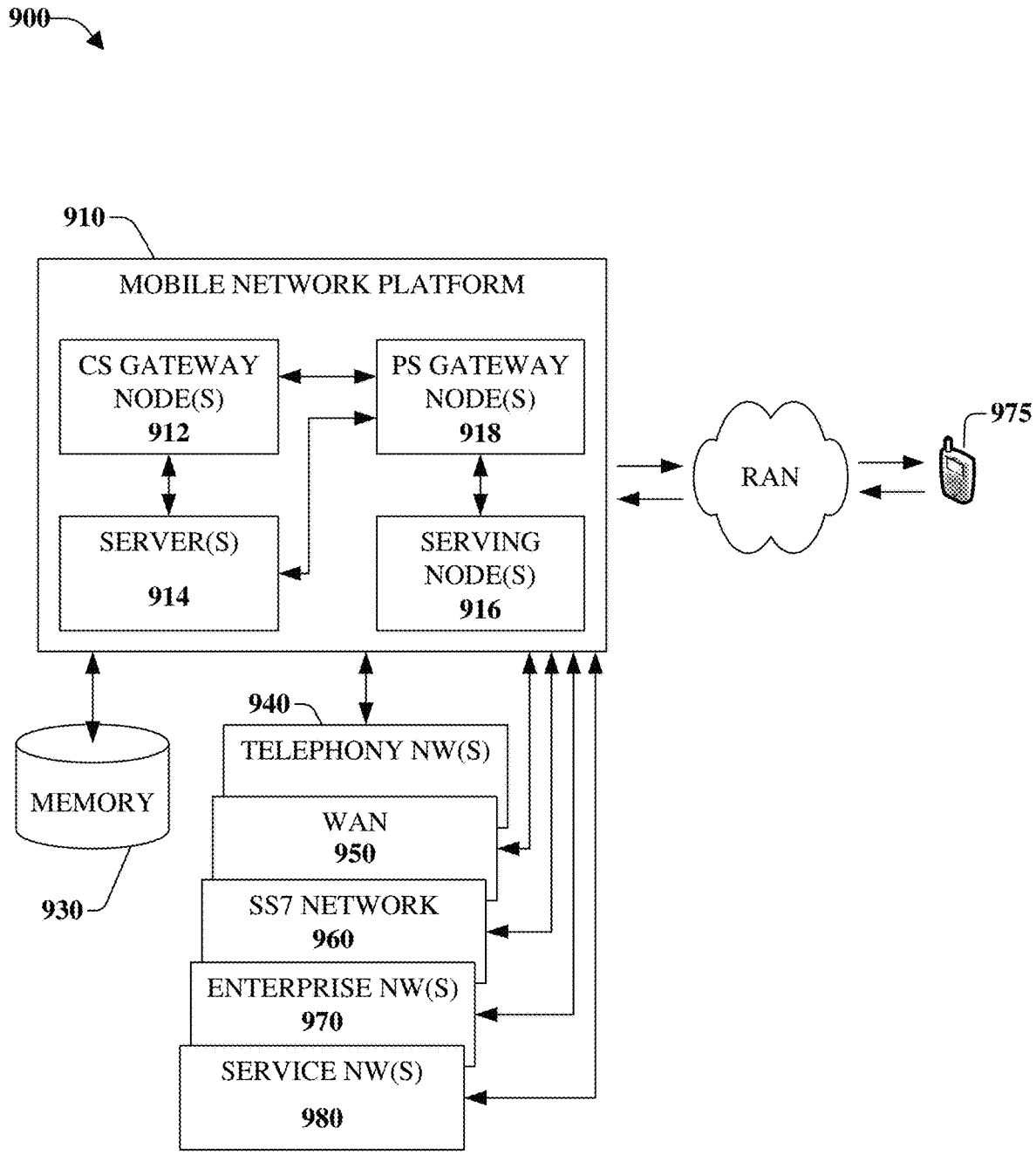
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
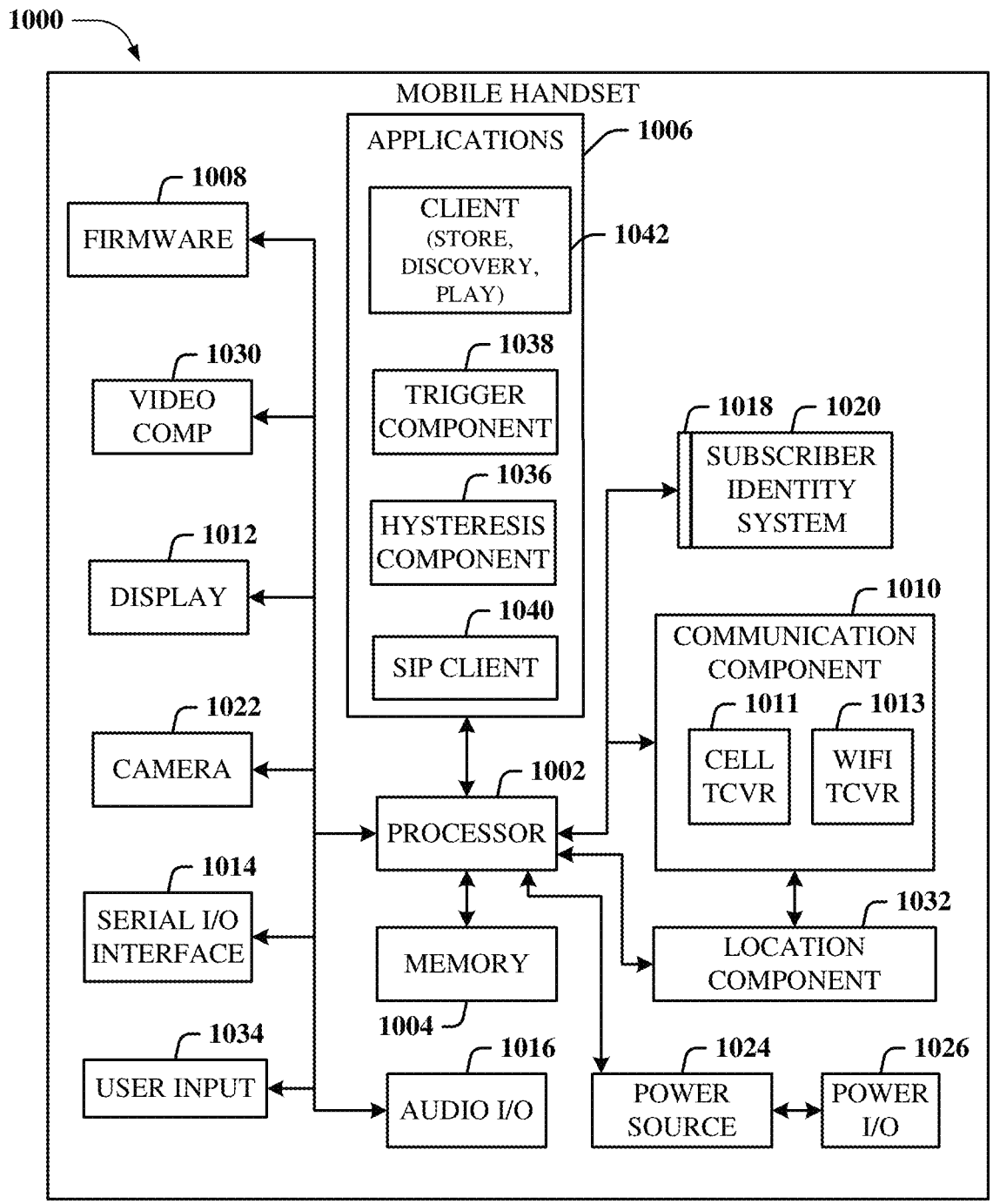
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touchscreen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
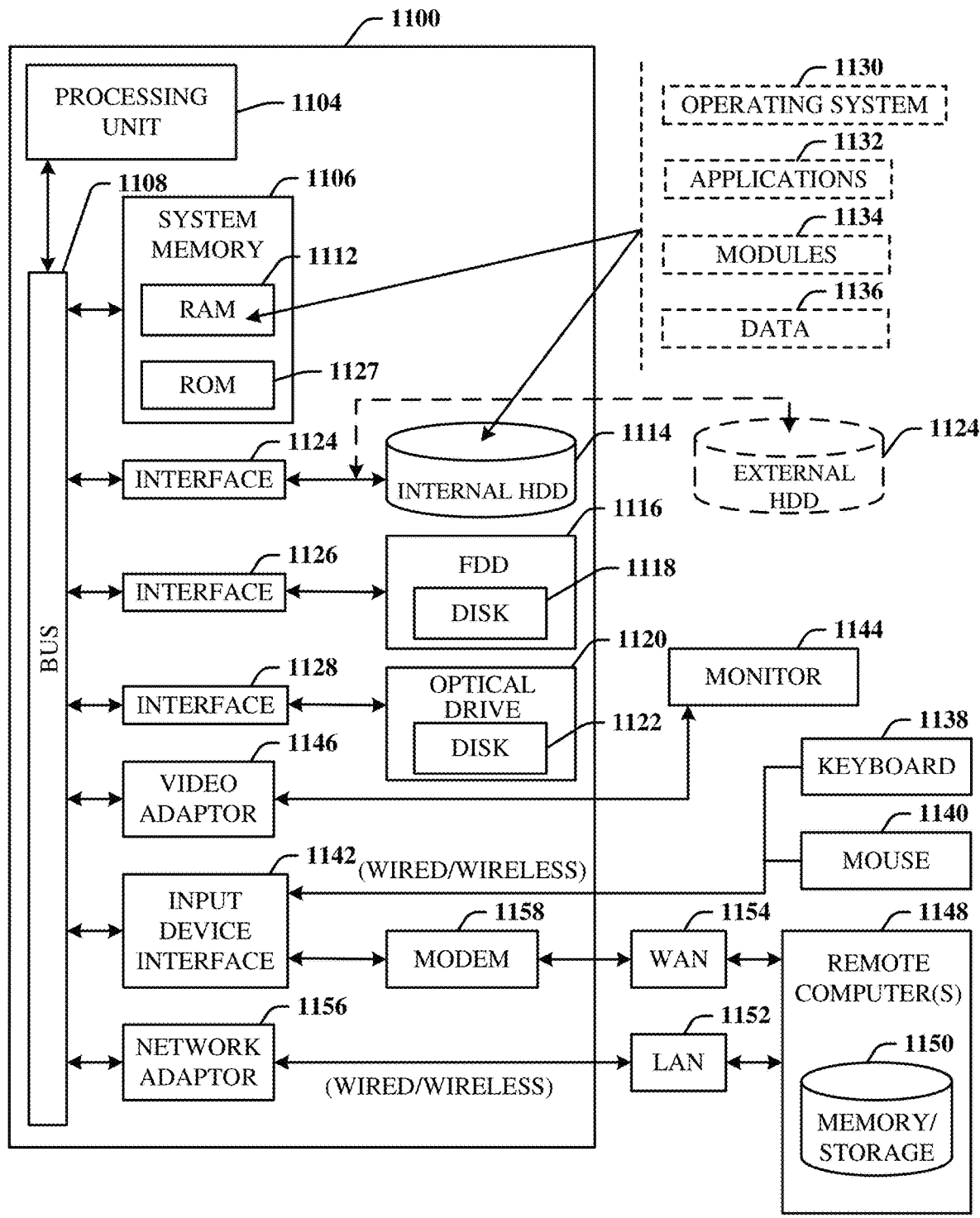
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 11, implementing various aspects described herein with regards to the end-user device can include a computer 1100, the computer 1100 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1127 and random-access memory (RAM) 1112. A basic input/output system (BIOS) is stored in a non-volatile memory 1127 such as ROM, EPROM, EEPROM, which BIOS contains the basic routines that help to transfer information between elements within the computer 1100, such as during start-up. The RAM 1112 can also include a high-speed RAM such as static RAM for caching data.

The computer 1100 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1100 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1100, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the innovation can be implemented with various commercially available operating systems or combinations of operating systems.

A user can enter commands and information into the computer 1100 through one or more wired/wireless input devices, e.g., a keyboard 1138 and a pointing device, such as a mouse 1140. Other input devices (not shown) can include a microphone, an IR remote control, a joystick, a game pad, a stylus pen, touchscreen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer 1100 typically includes other peripheral output devices (not shown), such as speakers, printers, etc.

The computer 1100 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1100 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1100 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the input device interface 1142. In a networked environment, program modules depicted relative to the computer, or portions thereof, can be stored in the remote memory/storage device 1150. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16 BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Systems, methods and/or machine-readable storage media for a group hybrid automatic repeat request procedure for sidelink group-case in advanced networks are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method comprising:
    determining, by a first user equipment comprising a processor, that first sidelink control information received via a sidelink control channel is successfully decoded and that second sidelink control information received via a sidelink shared channel is not successfully decoded, wherein the first sidelink control information and the second sidelink control information are received from a second user equipment, and wherein the first sidelink control information is received at a first defined resource of the sidelink control channel and the second sidelink control information is received at a second defined resource of the sidelink shared channel;
    based on the second sidelink control information not being successfully decoded, transmitting, by the first user equipment, negative acknowledgement data on an indicated feedback channel based on a group hybrid automatic repeat request feedback procedure, wherein, based on the first sidelink control information being successfully decoded, a successful acknowledgement is not transmitted by the first user equipment; and
    based on the transmitting, preparing, by the first user equipment, a channel estimator to receive respective retransmissions from respective user equipment of a group of user equipment; and
    receiving, by the first user equipment, respective retransmissions of the second sidelink control information via the sidelink shared channel from the respective user equipment of the group of user equipment in response to the negative acknowledgement data.

2. The method of claim 1, wherein the determining comprises determining the second sidelink control information failed a cyclic redundancy check examination, and wherein the method further comprises:
    after the transmitting the negative acknowledgement data, retaining, by the first user equipment, soft symbols of the second sidelink control information in a data store.

3. The method of claim 1, further comprising:
    prior to the receiving of the respective retransmissions of the second sidelink control information, receiving, by the first user equipment, a hybrid automatic repeat request retransmission.

4. The method of claim 1, further comprising:
    receiving, by the first user equipment, the respective retransmissions of the second sidelink control information in response to the negative acknowledgement data, wherein the respective retransmissions of the second sidelink control information is received from the second user equipment and a third user equipment, wherein the second user equipment is an original transmitter of the second sidelink control information, and wherein the third user equipment previously successfully decoded the second sidelink control information.

5. The method of claim 1, wherein the first sidelink control information comprises an indication to implement the group hybrid automatic repeat request feedback procedure.

6. The method of claim 1, wherein the negative acknowledgement data is first negative acknowledgement data, and wherein the method further comprises:
    determining, by the first user equipment, a retransmission of the respective retransmissions of the second sidelink control information is successfully decoded, resulting in decoded second information;
    sending, by the first user equipment, the decoded second information to network equipment to facilitate completion of a transmission of the second sidelink control information to the first user equipment; and
    participating, by the first user equipment, in the group hybrid automatic repeat request feedback procedure based on receipt of second negative acknowledgement data from a third user equipment included in the group of user equipment.

7. The method of claim 1, wherein the negative acknowledgement data is first negative acknowledgement data, and wherein the method further comprises:
    determining, by the first user equipment, a retransmission of the respective retransmissions of the second sidelink control information is successfully decoded, resulting in decoded second information;
    receiving, by the first user equipment and from a third user equipment, second negative acknowledgement data that indicates that the second sidelink control information was not successfully decoded at the third user equipment; and
    transmitting, by the first user equipment and to the third user equipment, the decoded second information during the group hybrid automatic repeat request feedback procedure.

8. The method of claim 1, wherein the receiving comprises receiving the respective retransmissions during the group hybrid automatic repeat request feedback procedure.

9. The method of claim 1, wherein the group hybrid automatic repeat request feedback procedure is configured to operate according to at least a fifth-generation wireless network communication protocol.

10. A first user equipment, comprising:
    a processor; and
    a memory that stores executable instructions that, when executed by the processor, facilitate performance of operations, comprising:
        decoding first sidelink control information, wherein the first sidelink control information is received from a second user equipment via a sidelink control channel and at a first defined resource of the sidelink control channel;
        determining that second sidelink control information has failed to be decoded, wherein the second sidelink control information is received from the second user equipment via a sidelink shared channel and at a second defined resource of the sidelink shared channel, wherein, based on a group hybrid automatic repeat request feedback procedure and the decoding of the first sidelink control information, a successful acknowledgement is not transmitted; and
        based on the group hybrid automatic repeat request feedback procedure and the determining that the second sidelink control information has failed to be decoded:
            sending negative acknowledgement data on an indicated feedback channel;
            preparing receipt of respective retransmissions from respective user equipment of a group of user equipment at a channel estimator; and
            receiving respective retransmissions of the second sidelink control information via the sidelink shared channel from the respective user equipment of the group of user equipment in response to the negative acknowledgement data.

11. The first user equipment of claim 10, wherein the determining that the second sidelink control information has failed to be decoded comprises determining that the second sidelink control information failed a cyclic redundancy check examination.

12. The first user equipment of claim 11, wherein the operations further comprise:
prior to the preparing, storing soft symbols of the second sidelink control information in a data structure.

13. The first user equipment of claim 10, wherein the receiving comprises receiving the respective retransmissions of the second sidelink control information from the second user equipment and a third user equipment, wherein the second user equipment is an original transmitter of the second sidelink control information, and wherein the third user equipment previously successfully decoded the second sidelink control information.

14. The first user equipment of claim 10, wherein the first sidelink control information comprises an indication to implement the group hybrid automatic repeat request feedback procedure.

15. The first user equipment of claim 10, wherein the negative acknowledgement data is first negative acknowledgement data, and wherein the operations further comprise:
determining a retransmission of the respective retransmissions of the second sidelink control information is successfully decoded, resulting in decoded second information;
sending the decoded second information to network equipment to facilitate completion of a transmission of the second sidelink control information to the first user equipment; and
participating in the group hybrid automatic repeat request feedback procedure based on receipt of second negative acknowledgement data from a third user equipment included in the group of user equipment.

16. The first user equipment of claim 10, wherein the negative acknowledgement data is first negative acknowledgement data, and wherein the operations further comprise:
determining a retransmission of the respective retransmissions of the second sidelink control information is successfully decoded, resulting in decoded second information;
receiving, from a third user equipment, second negative acknowledgement data that indicates that the second sidelink control information was not successfully decoded at the third user equipment; and
transmitting, to the third user equipment, the decoded second information during the group hybrid automatic repeat request feedback procedure.

17. A non-transitory machine-readable medium, comprising executable instructions that, when executed by a processor of a first user equipment, facilitate performance of operations, comprising:
determining that first sidelink control information is successfully decoded, wherein the first sidelink control information is received from a second user equipment at a first defined resource of a sidelink control channel, wherein based on a group hybrid automatic repeat request feedback procedure and based on the first sidelink control information being successfully decoded, a successful acknowledgement is not transmitted;
determining that second sidelink control information is not successfully decoded, wherein the second sidelink control information is received from the second user equipment at a second defined resource of a sidelink shared channel; and
based on the group hybrid automatic repeat request feedback procedure and the second sidelink control information not being successfully decoded,
sending negative acknowledgement data on an indicated feedback channel;
preparing receipt of respective retransmissions from respective user equipment of a group of user equipment at a channel estimator; and
receiving respective retransmissions of the second sidelink control information via the sidelink shared channel from the respective user equipment of the group of user equipment in response to the negative acknowledgement data.

18. The non-transitory machine-readable medium of claim 17, wherein the first sidelink control information comprises an indication to implement the group hybrid automatic repeat request feedback procedure.

19. The non-transitory machine-readable medium of claim 17, wherein the negative acknowledgement data is first negative acknowledgement data, and wherein the operations further comprise:
determining a retransmission of the respective retransmissions of the second sidelink control information is successfully decoded, resulting in decoded second information;
sending the decoded second information to network equipment to facilitate completion of a transmission of the second sidelink control information to the first user equipment; and
participating in the group hybrid automatic repeat request feedback procedure based on receipt of second negative acknowledgement data from a third user equipment included in the group of user equipment.

20. The non-transitory machine-readable medium of claim 17, wherein the negative acknowledgement data is first negative acknowledgement data, and wherein the operations further comprise:
determining a retransmission of the respective retransmissions of the second sidelink control information is successfully decoded, resulting in decoded second information;
receiving, from a third user equipment, second negative acknowledgement data that indicates that the second sidelink control information was not successfully decoded at the third user equipment; and
transmitting, to the third user equipment, the decoded second information during the group hybrid automatic repeat request feedback procedure.

* * * * *

UNITED STATES PATENT AND TRADEMARK OFFICE
CERTIFICATE OF CORRECTION

| | |
|---|---|
| PATENT NO. | : 11,870,594 B2 |
| APPLICATION NO. | : 16/411017 |
| DATED | : January 9, 2024 |
| INVENTOR(S) | : Xiaoyi Wang et al. |

It is certified that error appears in the above-identified patent and that said Letters Patent is hereby corrected as shown below:

On the Title Page

Column 1, Item (71), please delete "MA" and insert --GA--

Signed and Sealed this
Fifth Day of March, 2024

*Katherine Kelly Vidal*

Katherine Kelly Vidal
*Director of the United States Patent and Trademark Office*